April 1, 1958 M. T. HARVEY ET AL 2,828,820
NOVEL COMPOSITIONS OF MATTER AND METHODS AND
STEPS OF MAKING AND USING THE SAME
Filed May 13, 1957 2 Sheets-Sheet 2

Inventor
MORTIMER T. HARVEY
and PETER L. ROSAMILIA

By Angelo M. Pisarra

Attorney

United States Patent Office 2,828,820
Patented Apr. 1, 1958

2,828,820

NOVEL COMPOSITIONS OF MATTER AND METHODS AND STEPS OF MAKING AND USING THE SAME

Mortimer T. Harvey, South Orange, and Peter L. Rosamilia, Newark, N. J., assignors to Harvel Research Corporation, Irvington, N. J., a corporation of New Jersey Application May 13, 1957, Serial No. 658,883

15 Claims. (Cl. 166—31)

The present invention relates to novel compositions of matter, novel methods for preparing them and also to novel methods for treating bore hole walls and to novel structures produced thereby. In one of its more specific aspects the invention is directed to the art of sealing, plugging or consolidating earth such as rock, sand, soil or other type earth formations to prevent or at least reduce the flow of fluid therethrough and to render them impervious or at least less pervious to the flow of fluid therethrough. In one of its other aspects the invention is directed to improved methods for plugging, sealing, grouting, impregnating or consolidating masses or bodies of sand, soil, rock, or other earth formations which may be in a mineral or naturally occurring formation, such as in the plugging or sealing of oil wells, mines, shafts or other subsurface borings or tunnels. In addition to the treatment of naturally occurring formations, the compositions of this invention are readily adaptable to a variety of other uses which will be hereinafter described.

In one of its specific aspects the practice of the present invention is particularly applicable in the oil well and gas well fields where problems of stopping the flow of unwanted fluids can occur at various depths, from short distances below the ground level to depths as great as twenty or thirty thousand feet or more. In this considerable range of depths a corresponding range of temperatures also occurs, for example, from atmospheric temperatures to three hundred (300° F.) degrees Fahrenheit and greater, and this range of temperatures imposes a problem of sealing up certain earth openings and also permeable strata with solidifiable materials whose rate of solidification is affected by the temperature met. The applicability of the methods and materials of the present invention to the above stated problems will hereinafter appear in the following description.

The oil fields are in need of better materials for sealing earth openings and permeable formations to stop the flow of unwanted fluids and these sealing materials can be applied before or after the completion of a well.

In some cases the standard procedure for completing a well is to pump a Portland cement slurry down the inside of the steel pipe which serves as the well casing, around the bottom, and up the outside of the casing to serve as a filling between the outside of the casing and the wall of the bore hole. When the slurry reaches the desired height around the outside of the casing, the bottom is closed off and the cement at the bottom and around the outside of the casing is allowed to set to form a tubular inner lining between the bore hole wall and the steel casing and a plug at the bottom of the casing, leaving the rest of the casing free for use. If necessary the cement plug at the bottom can be drilled to reach further depths or openings can be made through the sides of the casing and the cement inner lining by shooting operations well known and commonly used in oil field operations.

In some oil fields clays such as bentonite and barium, calcium and other alkaline clays and gypsum cement (plaster of Paris) are used in a manner similar to that above described for Portland cement and for the same and similar purposes of filling in between the steel casing and the bore hole wall.

The present invention is also applicable in cases where difficulties are met in the use of Portland cement or clay due to flow of unwanted fluids. For example, in some cases the steel casing is not centered in the bore hole but lies close to or even against one side of the bore hole wall so that the Portland cement or clay filling is either thin or entirely absent at such points. In either case flow of unwanted fluids from one stratum to another higher or lower stratum which carries desired fluids such as oil or gas can occur and it then becomes necessary to block off the unwanted fluid. Sometimes this blocking off is done after the well is completed and setting material such as Portland cement is used, but due to the fact that a Portland cement or similar solid slurry will not permeate into rock or soil strata or for some other reason it has been found necessary to supplement the slurry with a water soluble resin which sets in place. The Portland cement serves as a filtering body by packing up against the bore hole wall and permitting the water of the slurry under the pressures used to pass through and into the bore hole wall carrying the water soluble resin with it. After a certain amount of the water soluble resin has been forced into the bore hole wall it is sealed off and left to stand under pressure until it sets in place.

The materials and methods used in the practice of the present invention are suitable for well plugging purposes in general, that is, for shutting off water, oil or gas, as operating methods may require, and they can be used for stopping or preventing the movement of loose or unconsolidated sand by setting just enough resin between the sand particles to set them in place and consolidate them into a stationary body and at the same time leaving a condition of porosity that will permit the flow of oil or gas, as required.

Briefly one of the methods employed in the practice of this invention is to use a solution or a slurry of ketone-aldehyde and preferably ketone-formaldehyde organic reaction products. Said reaction product may be of various consistencies varying from thin liquids to very thick, heavy bodied masses at atmospheric pressure and room temperature (70° F.).

Said ketone-aldehyde organic reaction products may be produced by reacting one or a combination of two or more ketones, with an aldehyde, and preferably formaldehyde, in the presence of a catalyst. Besides such reaction products, the term "ketone-aldehyde organic reaction product," as employed in the description and claims, is also meant to include a combination of a ketone-aldehyde reaction product together with another ketone-aldehyde reaction product, or a ketone-aldehyde reaction product reacted with another ketone.

Said ketone-aldehyde organic reaction products are water-soluble. By the term "water-soluble" as employed throughout the present description and claims we mean that the product is capable of dissolving in an equal volume of water. Said ketone-aldehyde organic reaction products are also characterized as follows: When a solution consisting of 80 grams of such reaction product in 20 grams of water is mixed with 10 grams of lime and said mixture is placed in an oven maintained at 130° F. and allowed to remain therein for 24 hours, at the end of that period the resultant mass will be found to be a substantially solid and substantially water-insoluble resinous product incapable of fusion at 300° F.

By the term "lime" as used throughout the description and claims is meant calcium hydroxide commonly found and sold on the market as hydrated lime and slaked lime.

Such ketone-aldehyde organic reaction products preferably employed in the practice of this invention are acetone-formaldehyde organic reaction products produced by reacting acetone and formaldehyde; or such acetone-formaldehyde reaction products in combination with one or more organic reaction products of formaldehyde and one or more other ketones; or (mixed ketones)-formaldehyde reaction products in which at least one of said ketones is acetone, produced by reacting formaldehyde with acetone and one or a combination of two or more other ketones. The other ketones preferably employed are those which have 3 hydrogen atoms on an alpha carbon, such as methyl ethyl ketone, methyl propyl ketone, diacetone alcohol, mesityl oxide, acetonyl acetone, ethyl ester of aceto acetic acid, etc. In this last reaction, we believe that there is produced a reaction mass containing a number of different reaction products, namely, acetone-formaldehyde, other ketone-formaldehyde and (acetone and other ketones)-formaldehyde reaction products; and that reaction masses containing such three reaction products may be produced by reacting a ketone-formaldehyde reaction product with another ketone. Said (mixed-ketones)-formaldehyde reaction products may be produced by reacting acetone-formaldehyde organic reaction product with another ketone or by reacting another ketone-aldehyde reaction product with acetone. By the term "formaldehyde," we mean to include formaldehyde as well as its equivalents, such as paraformaldehyde, trioxane, etc., as well as formaldehyde donors, such as hexamethylenetetramine, etc.

The employment of such ketone-aldehyde reaction product as a component in a combination containing hydraulic cement and water represents a marked departure from the prior art and especially in the art of treating earth bore hole walls. Such marked departure represented a very significant advance in the art for the reasons that such ketone-aldehyde reaction products are stable and are substantially unaffected by the temperatures encountered under normal storage and transportation conditions encountered in the field. In addition such ketone-aldehyde reaction products have the advantage of being so reasonably priced as to be economically feasible for use in combination with water and hydraulic cement. Moreover, such ketone-aldehyde organic reaction products have the still further advantage that when a slurry containing hydraulic cement, water and such ketone-aldehyde organic reaction product is forced against an earth bore wall by pressure there is some separation therefrom of a solution of said ketone-aldehyde reaction product which impregnates said wall and while maintained under pressure at the temperatures encountered, the ketone-aldehyde reaction product is converted to the substantially solid state and is in the nature of a gel and contains water.

In most cases, such preferred ketone-aldehyde reaction products which are preferably employed in the practice of this invention are those which are soluble in an equal volume of water, and especially those which at 70° F. exhibit flow and therefore are liquid and are liquid at 130° F. When in an aqueous solution of 4 parts by weight of said reaction product to 1 part by weight of water, said solution will have a viscosity at 25° C. in the range of 200–50,000 centipoises. When a 100 gram sample of such aqueous solution of any of said reaction products are mixed with 10 grams of lime and allowed to remain for 24 hours in an oven whose temperature is 130° F., at the end of that period the resultant mass will be found to be in the substantially solid state at room temperature and will remain in that state at elevated temperature of at least 300° F., and is also substantially water-insoluble.

A solution or slurry, generally aqueous and alkaline, may be employed for the aforesaid purpose of treating an earth bore hole wall to plug, seal or consolidate the earth formation of such a wall.

Instead of employing a straight alkaline solution or slurry of such reaction products, it is preferred to employ an aqueous alkaline slurry of one or a combination of two or more inorganic materials such as bentonite, barium, calcium or other alkaline clays, cementitious material, hydraulic cement, such as gypsum cement (plaster of Paris) and the like. Of these, it is preferred to employ one or a combination of two or more of the hydraulic cements such as Portland cement and aluminous cements produced by the sintering of lime-alumina-silica systems and containing di- and tri-calcium silicates and mono- and tri-calcium aluminates.

The various acetone-formaldehyde reaction products may be produced by reacting acetone and formaldehyde under varying conditions. Generally they are produced by reacting a mixture of acetone and formaldehyde to which has been added an alkaline catalyst. The molecular proportions of the acetone and formaldehyde which are reacted in the mixture are preferably 1 mole of acetone to at least 2 and preferably 3–5 moles of formaldehyde and an example of the catalyst employed is sodium hydroxide or any of its equivalents such as potassium hydroxide, calcium hydroxide, potassium carbonate, sodium carbonate, etc. These strongly alkaline catalysts are of such a nature that when added to such mixtures of acetone and formaldehyde they are capable of providing an exothermic reaction between the acetone and formaldehyde after the reaction has been initiated with the aid of external heat.

By employing the procedure set forth in Examples A–D and controlling the quantity of alkaline catalyst or agent employed, there may be produced acetone-formaldehyde reaction products which are normally liquid, soluble in an equal volume of water, with high yields of such water soluble reaction products, said yields being at least 75% by weight of the combined weights of the acetone and formaldehyde in the original charge.

When the mole ratio of the acetone to the formaldehyde in the charge is one to three, the quantity by weight of sodium hydroxide employed is less than 4%, generally 1–3% and preferably approximately 2% of the combined weights of acetone and formaldehyde in the charge; when the mole ratio of the acetone to the formaldehyde in the charge is one to four, the quantity by weight of sodium hydroxide employed is less than 5%, generally 1.5–4% and preferably approximately 2.5% of the combined weights of acetone and formaldehyde in said charge; when the mole ratio of acetone to formaldehyde in the charge is one to five, the quantity by weight of sodium hydroxide employed is less than 7.75%, generally 2–6% and preferably approximately 4% of the combined weights of acetone and formaldehyde in said charge. Of course, instead of employing sodium hydroxide the alkaline equivalent of any other strongly alkaline reagent may be used.

The sodium hydroxide or other alkaline reagent is preferably first dissolved in a solvent such as water and the alkaline reagent is added to the charge as a solution. For best results, the solution of alkaline reagent should not be added all at one time. It may be added in increments the amounts of which are dictated or controlled by the speed of reaction desired. After the entire charge of acetone and formaldehyde is contained in the reaction vessel, the aqueous solution generally 50% concentration of the sodium hydroxide or other alkaline reagent is made up in a separate container, with the amount of reagent dependent upon the mole ratio of acetone to formaldehyde in the charge. The aqueous alkaline solution is divided into three or four equal parts. One part is then added to the acetone and formaldehyde charge which is constantly stirred throughout the entire process. After this addition the mass is externally heated to a temperature of about 120–130° F. to initiate the reaction. The heat is shut off and the mass now reacts exothermically and its temperature rises and by the use of cooling water in the jacket of the reaction vessel its temperature is allowed to rise to approximately 200° F. Then its temperature goes down to approximately 175° F. whereupon the second quarter of the alkaline solution is added. Again the temperature rises and is allowed to rise to approximately 200° F. and falls to approximately 175° F. The third quarter of the alkaline solution is added and again the temperature rises and is allowed to rise to approximately 200° F. and falls to approximately 175° F. The last quarter of the alkaline solution is added and again the temperature rises and is allowed to rise to approximately 200° F. and then falls to approximately 140° F. whereupon the cooling water is shut off. Then the mass may be maintained in the state of boiling under a reflux condenser for ½ hour to 1 hour, if desired and then allowed to cool to approximately 140° F. Either with or without the boiling under reflux, vacuum is now gradually applied in the reaction vessel to remove some of the water, and to cause cooling of the mass until the temperature of the mass is lowered to approximately 105–110° F. At this stage a 28–29″ vacuum is applied and dehydration is continued until a solution of the desired percentage of solids is obtained or until the resin is substantially anhydrous. In either case the reaction product of a resinous nature produced is liquid, water soluble in an equal volume of water and thermosetting under alkaline conditions and measures at least 75% of the combined weights of the acetone and formaldehyde in the original charge. Said reaction product is also characterized by being stable for months at temperature of 30° C. Said reaction product besides having such good stability characteristics especially when dehydrated to an aqueous solution of 60–85% concentration also has the characteristics of having excellent pumping qualities in aqueous solution and also when in an aqueous slurry of hydraulic cement, has very high bonding strength when converted to the solid state, has good antifriable characteristics when converted to the solid state, has good squeezability characteristics when in an aqueous slurry of hydraulic cement whereby it may be squeezed out therefrom when subjected to pressure which may vary and be as high as and run higher than 10,000 pounds per square inch.

The following are examples of methods for producing acetone-formaldehyde reaction products which may be used in the practice of this invention and are given merely by way of illustration and not in a limiting sense.

*Example A.—1 mole acetone-4 moles formaldehyde*

300 lbs. acetone
1700 lbs. aqueous solution of formaldehyde (37% concentration)
25 lbs. NaOH in
60 lbs. water The caustic soda-water solution was divided into four equal parts. All of the acetone and formaldehyde were loaded into a jacketed reaction vessel provided with appropriate stirring equipment. With the stirring equipment in operation and with steam turned on through the jacket, the acetone and formaldehyde mixture was heated to a temperature of about 120–125° F. whereupon the steam was cut off and one portion of the caustic soda-water solution was added thereto. Upon the addition of the caustic soda solution to the mixture, the reaction is initiated and proceeds exothermically whereupon the temperature of the mass being agitated begins to rise and when it reaches approximately 130° F. the cold water is turned on and controlled so that the exothermic reaction proceeds and the temperature slowly rises to approximately 200° F., and then slowly begins to fall. When it falls to approximately 185° F., the second portion of the caustic soda water solution is added whereupon the temperature of the mass again rises and is controlled by the cooling water whereupon it is allowed to rise slowly again to approximately 200° F. Again the temperature begins to fall and when it reaches approximately 185° F. the procedure is repeated allowing the temperature slowly to rise and fall as before between the additions of the caustic soda-water solution and keeping the cold water on the jacket at all times. After the last addition of caustic soda-water solution whereupon the temperature of the mass was allowed to rise to approximately 200° F. and then begins to fall, and in this instance it is allowed to fall to approximately 140–150° F. at which stage the cold water is shut off. During this entire operation the vent at the top of the reacting vessel was maintained open and while still open the vacuum is turned on at this stage. The vent is now slowly closed, while vacuum is maintained and dehydration occurs at a very rapid rate, and temperature of the mass begins to drop. Steam is admitted to the jacket to allow dehydration to progress rapidly. In this manner vacuum is applied and maintained in the reaction vessel and dehydration proceeds and may be continued to provide the desired concentration of the acetone-formaldehyde reaction product therein. This dehydration may be continued until the concentration of the acetone-formaldehyde reaction product is 60–100% and preferably 60–85%. The amount of said reaction product produced according to this method measures more than 75% of the combined weights of the acetone and formaldehyde in the original charge. Said acetone-formaldehyde reaction product is of a resinous nature, is liquid, is hereinafter known as Product A, is amber-colored, and is soluble in an equal volume of water.

*Example B.—1 mole of acetone-3 moles of formaldehyde*

30 parts of acetone
126 parts of aqueous solution of formaldehyde (37% concentration)
2 parts NaOH in
4 parts water Using the same procedure as that set forth in Example A, the resultant acetone-formaldehyde reaction product, hereinafter known as Product B, was likewise amber-colored liquid and measured more than 75% of the combined weights of acetone and formaldehyde in the original charge. Product B was soluble in an equal volume of water.

*Example C.—1 mole acetone-5 moles of formaldehyde*

30 parts of acetone
212 parts of aqueous solution of formaldehyde (37% concentration)
4 parts NaOH in
8 parts water Employing the same procedure as that set forth in Example A, except that after the last addition of caustic soda-water solution and subsequent drop in temperature following the last exothermic reaction, the entire mass is heated to boiling under a reflux condenser for approximately 15 minutes. The quantity of free formaldehyde in the mass is determined and found to be 5.2% of the amount of formaldehyde in the original charge. Upon dehydration at 210° F. in the manner heretofore indicated, the resultant substantially anhydrous resin known as Product C was an amber colored, viscous mass, infinitely soluble in water and measuring more than 75% of the combined weight of acetone and formaldehyde in the original charge.

*Example D.—1 mole acetone-4.5 moles formaldehyde*

165 lbs. acetone
1050 lbs. aqueous solution of formaldehyde (37% concentration)
13.5 lbs. NaOH in
27.5 lbs. water Employing the same procedure as that set forth in Example A, there is produced an 80% aqueous solution of Product D which is essentially an acetone-formaldehyde reaction product of a resinous nature, normally liquid, of amber color and soluble in an equal volume of water.

Such 80% aqueous solution of Product D is stable for 6 mos. at 30° C.

Example E

If desired, the acetone-formaldehyde reaction products such as A, B, C, and D may be treated or polymerized to increase its viscosity by merely heating or to increase its viscosity and to decrease the content of free formaldehyde present. For this latter purpose in Examples A–D, the dehydration step is terminated when the acetone-formaldehyde organic reaction product in aqueous solution measures about 65–85%. Then said aqueous solution of said partially dehydrated acetone-formaldehyde reaction product is placed in a reacting vessel and there is added thereto an aqueous solution of an alkali and preferably a mild alkali such as sodium sulphite, sodium acetate, potassium sulphite or equivalent compound to increase the pH of the mix. The mix is heated slowly to a temperature of about 250° F. and is maintained until the viscosity of 4 parts of the resin therein when dissolved in one part of water measures 2,000–50,000 centipoises at 25° C. This provides a simple, easily controllable method which is eminently suitable in factory practice for thickening or increasing the viscosity of the acetone-formaldehyde resin to the desired degree, and practically eliminating the danger of the resin going to the infusible state. More specifically, for example, 250 lbs. of an 80% solution of said acetone-formaldehyde resin, after the partial dehydration step, is now mixed with an aqueous solution consisting of approximately 7 lbs. of sodium sulphite dissolved in a small amount of water. The mixture is heated to approximately 250° F. and maintained at that temperature until a sample of 4 parts of the resin when dissolved in one part of water is in the aforementioned viscosity range. When this viscosity is reached, the heat is cut off and enough water is added to the resin to provide a solution which measures 4 parts of resin to each part of water present. This batch which is an aqueous solution of said resin will be within the viscosity range heretofore set forth. Such acetone-formaldehyde organic reaction products so produced from Products A, B, C, and D are hereinafter respectively known as Products E, F, G, and H and all of them are capable of flow at 130° F., are soluble in water.

An organic catalyst, such as an amine, may be employed with or without the aid of an inorganic catalyst as shown by the following illustrative examples. Throughout this entire description and claims all parts are by weight unless otherwise specified.

Example I 1700 parts of aqueous solution of formaldehyde (37%)
600 parts of acetone
25 parts of triethylamine All of said components are mixed together and warmed gently to accelerate the exothermic reaction which ensues and is allowed to continue under a reflux condenser after the external source of heat has been removed. When exothermic reaction subsides, external heat is again applied to maintain the mass in the state of boiling under the condenser for ½ hour. The condenser is then removed and the mass is heated to about 130° C. to dehydrate. The resultant substantially anhydrous acetone-formaldehyde liquid reaction product is of a resinous nature, is straw colored and hereinafter known as Product I and measured about 950 parts containing 0.75% nitrogen.

Example J

Employing the same components in the respective amounts set forth in Example I and employing the procedure as therein set forth except that the acid number of the formaldehyde solution has first been ascertained and then sufficient sodium carbonate is added thereto to reduce the acid number thereof to zero. The resultant substantially anhydrous acetone-formaldehyde liquid reaction product which is of a resinous nature, straw and is hereinafter known as Product J and measured about 950 parts.

Example K

To 1700 parts of aqueous solution of formaldehyde (37%) is added a solution of 315 parts of acetone together with 25 parts of triethylamine. Under reflux condenser the mass is warmed gently to accelerate the exothermic reaction. After the exothermic reaction has subsided, a solution of 315 parts of acetone together with 25 parts of triethylamine is added thereto. By the use of external heat the mass is maintained in the state of boiling under said condenser for 30 minutes. Then the mass is heated to about 130° C. to substantially completely dehydrate it. The yield is 973 parts of substantially anhydrous liquid acetone-formaldehyde reaction product is of a resinous nature, is straw colored colored and is hereinafter known as Product K.

Example L 510 parts of aqueous solution of formaldehyde (37%)
360 parts of acetone
75 parts of diethylamino propyl amine The above components were mixed and placed under a reflux condenser and allowed to stand at room temperature (70° F.) whereupon an exothermic reaction occurred and the temperature of the mass reached 76° C. The mass was allowed to react for about 1½ hours, the condenser removed and then the mass was maintained, under reduced pressure of 70 mm. of mercury pressure, at a temperature of 95° C. until it was substantially completely dehydrated. This yielded 342 parts of substantially anhydrous liquid acetone-formaldehyde reaction product which was of a resinous nature, was straw colored and is hereinafter known as Product L.

Example M 510 parts of aqueous solution of formaldehyde (37%)
180 parts of acetone
75 parts of diethylamino propylamine Employing the same procedure as set forth in Example 3, there was obtained a yield of 325 parts of substantially anhydrous liquid acetone-formaldehyde reaction product which is of a resinous nature, is straw colored and is hereinafter known as Product M.

Example N 170 parts of aqueous solution of formaldehyde (37%)
60 parts of acetone
0.5 part of diethylamino propyl amine The above components were mixed and placed under a reflux condenser. The pH of the mix was determined and found to be about 9. The mix was heated gently to accelerate the speed of the exothermic reaction. When the exothermic reaction had subsided, the mass was maintained in the state of boiling for ½ hour. Then the condenser was removed and the mass dehydrated under vacuum at above 70 mm. of mercury pressure and a temperature of about 90°–95° C. to obtain a liquid substantially anhydrous acetone-formaldehyde reaction product which was of a resinous nature and straw colored and is hereinafter known as Product N.

Examples O–Q

Using the same first two components of Example N in the same amounts as therein set forth and also the third component, except that the third component is present in the following respective amounts: 1 part in one case, 6 parts in another and 26 parts in the third and using the method set forth in Example N, there were obtained liquid substantially anhydrous acetone-formaldehyde reaction products all of which were of a resinous nature, straw colored and are hereinafter respectively known as Products O, P, and Q. The pH of Products O, P, and Q were determined and found to be respectively 8.5, 9.5 and 10.5. Such determinations were made on aqueous solutions of said respective products dissolved in 4 times their weight of water.

Employing the particular three components of Examples 1–6 herebelow, in each instance such respective three component mixtures were gently heated and continuously stirred whereupon reaction between the ketone and aldehyde was initiated and continued only so long as the resultant reaction product is water soluble and is terminated at the first observation of any cloudiness. Said entire masses are respectively charged into equal volumes of 80% aqueous solutions of Product I, to provide Products R, S, T, U, V, and W.

Example 1

255 parts of aqueous solution of formaldehyde (37%)
110 parts of diacetone alcohol
5 parts of diethyl amine propyl amine

Example 2

170 parts of aqueous solution of formaldehyde (37%)
60 parts of mesityl oxide
5 parts of diethylamine propyl amine

Example 3

340 parts of aqueous solution of formaldehyde (37%)
72 parts of methyl ethyl ketone
35 parts of diethyl amino propyl amine

Example 4

170 parts of aqueous solution of formaldehyde (37%)
60 parts of acetonyl acetone
26 parts of diethyl amino propyl amine

Example 5

255 parts of aqueous solution of formaldehyde (37%)
130 parts of ethyl ester of aceto acetic acid
25 parts of diethyl amino propyl amino

Example 6

170 parts of aqueous solution of formaldehyde (37%)
60 parts of isophorone
25 parts of diethyl amino propyl amine

Example X 170 parts of aqueous solution of formaldehyde (37%)
60 parts of acetone
1 part of triethylamine The components are charged into a stainless steel autoclave and heated to raise the pressure therein to 100 lbs. per sq. in. and the mass was so maintained for 1 hour. The source of heat was removed and then the mass was dehydrated at 95° C. under 40 mm. of mercury pressure to obtain a yield of 82 parts of anhydrous liquid acetoneformaldehyde reaction product of a resinous nature, which is stable and water soluble and is known hereinafter as Product X.

Instead of using a closed vessel, such as the autoclave, the reaction may be carried out at atmospheric pressure under a reflux condenser and maintained in the state of boiling for about ½ hour and the substantially anhydrous reaction product obtained is liquid, water soluble and resinous and measures 95 parts and is hereinafter known as Product Y.

All of said ketone-formaldehyde reaction products, in which an amine is the catalyst employed, are alkaline, that is the pH of the water solution thereof is at least 7.2. A sample of reaction Product I, for example, is strongly alkaline and has been stable for more than 2 months.

Example Z 170 parts of aqueous solution of formaldehyde (37%)
30 parts of acetone
25 parts of triethylamine Employing the same procedure as that set forth in Example I there was obtained a substantially anhydrous acetoneformaldehyde liquid reaction product which was of a resinous nature and is hereinafter known as Product Z and measured about 95 parts.

Example AA 85 parts of aqueous solution of formaldehyde (37%)
30 parts of paraformaldehyde
60 parts of acetone
25 parts of triethylamine The four components are mixed together under a reflux condenser and warmed gently to increase the speed of the exothermic reaction which proceeds and the temperature of mass goes to about 165° F. After it has subsided, the mass is maintained in the state of boiling under the reflux condenser for about 1 hour. Remove condenser and the mass is heated to about 130° C. to dehydrate and the resultant product is a substantially anhydrous liquid reaction product, hereinafter known as Product AA weighing about 85 parts.

Example BB 60 parts of acetone
340 parts of aqueous solution of formaldehyde (37%)
1.2 parts of potassium carbonate dissolved in
2.5 parts of water were charged into a reacting unit having a reflux condenser and mixed together. External heat was applied until the temperature of the mass reached 145° F. External heat was removed because the exothermic reaction started and continued. The temperature rose to 165° F. The reaction was allowed to continue for 15 minutes and the temperature began to drop. The mass was cooled to about 140° F. and at this stage 60 parts of acetone and 5 parts of triethyl amine are added. Heat was applied to maintain the mass in the state of boiling under the condenser for ½ hour. The condenser was removed and the mass maintained at 225° F. to partially dehydrate and provide an 80% aqueous solution of the acetone-formaldehyde reaction product hereinafter known as Product BB. The viscosity of said solution at 25° C. was 2440 cp., the specific gravity 1.205 at 25° C. and the index of refraction 1.4857 at 25° C.

Example CC 340 parts of aqueous solution of formaldehyde (37%)
60 parts of acetone
2 parts of diethyl amino propyl amine were charged into a reacting vessel having a reflux condenser. The mass was stirred and external heat applied to hasten the exothermic reaction. The temperature rose to 175° F. and remained at that temperature for about 15 minutes. Then the mass was cooled to 140° F. and 60 parts of acetone and 12 parts of diethyl amino propyl amine were added. Again an exothemric reaction set in and the temperature rose to 165° F. At this stage, external heat was applied and the mass was maintained in the state of boiling for ½ hour. The condenser was removed and the mass was maintained at 225° F. to dehydrate to provide an 80% aqueous solution to resinous acetoneformaldehyde reaction product known hereinafter as Product CC which solution at 25° C. had the following characteristics: viscosity: 1670 cp., specific gravity: 1.215, and index of refraction: 1.4818.

Example DD 1700 parts of aqueous solution of formaldehyde (37%)
315 parts of acetone were mixed together and then there were added thereto:

12.5 parts of triethylamine

The reaction was allowed to take place and cooling provided so that the exothermic reaction is not too vigorous. When the exothermic reaction had subsided, a charge of 315 parts of acetone
12.5 parts of triethylamine was added to said mass with stirring and a second exothermic reaction was allowed to take place. Then after this reaction had subsided the mass was refluxed for 1½ hours, then dehydrated at elevated temperature to provide Product DD.

*Example EE*

170 parts of aqueous solution of formaldehyde (37%)
60 parts of acetone
3 parts of diethyl amino propyl amine Employ the same procedure as that set forth in Example N, there was provided substantially anhydrous acetone-formaldehyde reaction product hereinafter known as Product EE.

*Example FF*

170 parts of aqueous solution of formaldehyde (37%)
60 parts of acetone
7.5 parts of diethyl amino propyl amine Employ the same procedure as that set forth in Example N, there was provided substantially anhydrous acetone-formaldehyde reaction product hereinafter known as Product FF.

Employing the same procedure as that set forth in Example A, except that instead of acetone being the only ketone employed, a mixture of acetone and one or more other ketones are used, and the components are used in the following proportions:

*Example GG*

50 parts of acetone
25 parts of methyl ethyl ketone
425 parts of aqueous formaldehyde (37% conc.)
6 parts NaOH in
12 parts of water providing a solution consisting of 80 parts of resinous reaction product, hereinafter known as Product GG, in 20 parts of water.

*Example HH*

37.5 parts of acetone
37.5 parts of methyl ethyl ketone
425 parts of aqueous formaldehyde (37% conc.)
6 parts of NaOH in
12 parts of water to provide a solution consisting of 80 parts of resinous reaction product, hereinafter known as Product HH, in 20 parts of water.

*Example II*

25 parts of acetone
50 parts of methyl ethyl ketone
425 parts of aqueous formaldehyde (37% conc.)
6 parts of NaOH in
12 parts of water to provide a solution consisting of 80 parts of resinous reaction product, hereinafter known as Product II, in 20 parts of water.

*Example JJ*

65 parts of acetone
10 parts of methyl ethyl ketone
425 parts of aqueous formaldehyde (37% conc.)
6 parts of NaOH in
12 parts of water to provide a solution consisting of 80 parts of resinous reaction product, hereinafter known as Product JJ, in 20 parts of water.

All of said ketone-aldehyde reaction products, specific illustrative examples of which are Products A—JJ respectively are water soluble and are further characterized as follows: When a 100-gram solution consisting of 80 gram samples thereof in 20 grams of water is mixed with 10 grams of lime and the mixture is placed in an oven at 130° F. and allowed to remain therein for 24 hours at the end of that period the mass will be substantially solid resinous product infusible at 300° F., and is substantially water-insoluble.

For a fuller understanding of the nature and objects of this invention, reference should be had to the following detailed description taken in connection with the accompanying drawings, in which.

Figure 1:
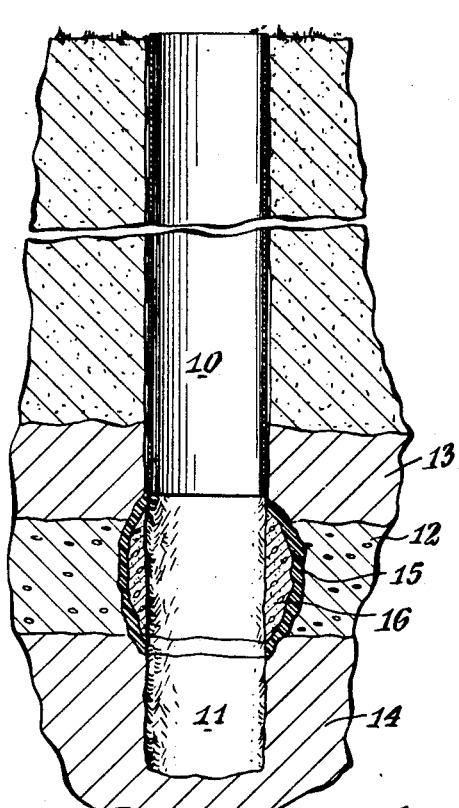
Fig. 1 is a shortened vertical view partly in section and partly in side elevation showing a bore hole wall embodying the invention.

The ketone-aldehyde reaction products soluble in an equal volume of water and convertible to the solid state, examples of which are Products A—JJ, may be combined with water alone in the desired concentration and preferably with water and an alkaline material and preferably an hydraulic cement and most preferably with Portland cement to provide novel materials of great qualities for use in the fields of oil wells and gas wells. In general, when the Portland cement is omitted, it is preferable to add to the aqueous mass of water and ketone-aldehyde reaction product a quantity of alkaline catalyst such as calcium hydroxide, lime, etc., for example, to aid in the setting of the reaction product. The amount of alkaline catalyst employed of course may vary depending upon the desired setting time and the viscosity of the particular ketone-aldehyde reaction product employed. The concentration of said reaction product in water is preferably 40 to 90% by weight of the mass. When hydraulic cement is employed, the ratio of cement to the ketone-aldehyde reaction product is generally in the range of 100 parts of Portland cement to 100 to 1 parts of said reaction product and the amount of water is also variable depending upon the slurry desired.

Illustrative examples of comparative setting times for cement slurry and for cement slurries in the water of which the water soluble ketone-aldehyde reaction product are contained or dissolved in various proportions are given below.

*Example C–1*

50 grams of Portland cement and
20 grams of water, when mixed together and placed in an oven at about 220° F. became thick in fifteen minutes and was completely set in forty minutes.

*Example C–2*

50 grams Portland cement
25 grams of 80% aqueous solution of Product A and
15 grams of water when mixed together and placed in an oven at about 220° F. became completely set in one hour and forty minutes.

*Example C–3*

A sample of the mixture of Example C–1 above at room temperature became completely set in about sixteen hours.

*Example C–4*

A sample of the mixture of Example C–2 became hard at room temperature (about 65° F.) in seventy-two hours (maximum).

In the following tables are given, by weight, components of a control slurry and slurries of the present invention with setting results and times at stated temperatures. P. C. indicates Portland cement.

TABLE I

|  | Control | C-1 | C-2 | C-3 | C-4 |
|---|---|---|---|---|---|
| P. C. | 50 | 50 | 50 | 50 | 50. |
| 80% of aqueous solution of Product A. |  | 1 | 5 | 25 | 50. |
| Water | 20 | 20 | 20 | 15 | 10. |
| 16 hrs. at 72° F. | Hard | Hard | Hard | Set, Not Hard. | Not set. |
| After 12 days at 72° F. | Hard | Hard | Hard | Hard Center. | Soft set. |

TABLE II

|  | Control | C-1 | C-2 | C-3 | C-4 |
|---|---|---|---|---|---|
| P. C. | 50 | 50 | 50 | 50 | 50. |
| 80% of aqueous solution of Product A. | 25 | 25 | 25 | 25 | 25. |
| Water | 15 | 15 | 15 | 15 | 15. |
| Lime | 0 | 1 | 3 | 5 | 10. |
| Setting time at room temperature. | 48 hrs. |  |  | 6 hrs. | 6 hrs. |
| Setting time at 212° F. | 1½ hrs | 41 min. | 29 min. | 27 min. | 26 min. |

The viscosity of Product A in solution in water to 80% solids in one sample was 732.6 centipoises at 25° C.

According to this invention there is prepared the desired solution or slurry which generally comprises an alkaline aqueous solution or slurry of such ketone-aldehyde organic reaction product with the proportion of said reaction product employed in the makeup of said solution or slurry being variable and for most purposes measuring by weight about 12 to 90% of the solution or slurry. In most cases there is prepared an aqueous slurry of the type hereinafter known as Slurry I by mixing an hydraulic cement and preferably Portland cement, water and said ketone-aldehyde reaction product. Examples of some of said reaction products employed in the preparation of the alkaline solutions or slurries of said reaction products as well as slurries known as SI are Products A—JJ. The ratio by weight of hydraulic cement to such reaction product in SI may vary, but in general is 100 parts of the former to 100 to 1 parts of the latter, and the amount of water employed is also variable depending upon the consistency required. For most purposes it is preferable that the amount of ketone-aldehyde organic reaction product in a slurry of said reaction product together with water and whatever substantially water insoluble alkaline inorganic material employed be such that the ratio by weight of the reaction product to the inorganic material be 5–100 parts of the former to 100 parts of the latter.

In a case where during the drilling operation of an oil or gas well as shown in Fig. 1, there is a casing 10 extending partially into the bore hole. In the particular formation shown in Fig. 1 for the purposes of illustration, that part 11 of the bore hole below the casing 10 extends through a water bearing opening or stratum 12 between a pair of impervious strata 13 and 14. Because water from the opening or stratum 12 flows into the bore hole, for obvious reasons it becomes necessary to seal or plug the opening or stratum 12 to reduce and more preferably to prevent completely the flow of water therefrom into the bore hole.

Also according to this invention, the aforesaid results may be attained by employing the various alkaline solutions or slurries of said acetone-formaldehyde reaction products. For those purposes it is preferred to use those known as SI and in this illustrative example there is employed a slurry SII prepared by mixing 100 parts by weight of Portland cement, 30 parts by weight of water and 70 parts by weight of an 80% aqueous solution of Product A prepared according to Example A with the dehydration step carried to 80% concentration. The slurry SII is pumped through the casing 10 to fill the part 11 of the bore hole and until its level is well up into the lower end of casing 10 whereby some of the slurry SII is located in the space between the outside of the lower end of the casing 10 and the bore hole wall adjacent thereto. Then while the slurry is subjected to pressure which measures 10,000–15,000 pounds per square inch whereby more of the slurry extends further up outside of the casing while that in part 11 has the acetone-formaldehyde component thereof forced or "squeezed out" of the slurry to provide an outer layer 15 rich in the acetone-formaldehyde component, with the inner part 16 now being richer in Portland cement. The acetone-formaldehyde rich outer layer 15 extends into the hole or water bearing stratum and together with the Portland cement rich inner part seals or plugs stratum or opening 12. The pressure is maintained for the required period of time, and after the layers 15 and 16 have become set or hardened to seal or plug stratum 12 a drilling tool is lowered through casing 10 and the bulk of the mass of hardened or set slurry in part 11 and rich in Portland cement is drilled through leaving the bore hole wall as shown in Fig. 1 with the stratum or hole 12 substantially completely sealed or plugged by the acetone-formaldehyde rich inner covering or layer 15 now in the substantially solid state and contiguous with the hardened or set Portland cement rich layer 16. Drilling may be continued through the lower impervious layer if desired.

Figure 2:
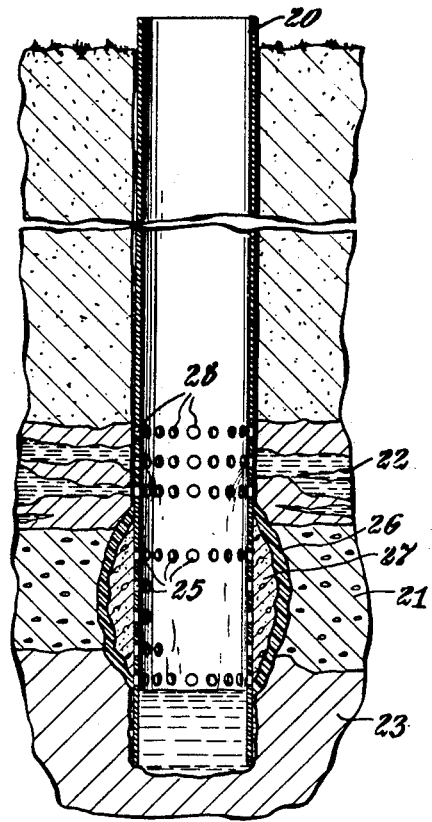
Fig. 2 is a shortened vertical view in section showing a bore hole wall embodying the invention.

In another case where, in the oil or gas well field, there is a casing 20 in the earth bore hole through the formation to be sealed, a slightly different procedure is followed. In the particular formation shown in Fig. 2 for the purposes of illustration, the casing 20 extends through a water bearing stratum or opening 21 between an upper oil and gas bearing stratum 22 and a lower impervious stratum 23. Because water from stratum 21 enters the casing 20, it becomes necessary to seal it off if possible. The casing may be shot at its lower end in the manner known to the art to provide openings 25 therethrough which are adjacent the water bearing strata. Like before, a slurry such as SII is pumped into the lower part of the casing 20 and under pressure through the holes 25 and into the space between the outer side of the casing and the stratum 21 and into stratum 31 and maintained under pressure of 10,000–15,000 pounds per square inch for a sufficient time. After setting, like in Fig. 1, there will be a seal or plug of an acetone-formaldehyde rich outer layer 26 which is now solidified and an outer layer of set or hardened Portland cement rich layer 27. If desired, the hardened slurry within the casing 20 may be drilled out. Then the casing 20 is shot through to provide openings 28 around the oil and gas bearing stratum 22, and now with stratum 21 sealed off the well produces oil and gas without large quantities of water from stratum 21.

Figure 3:
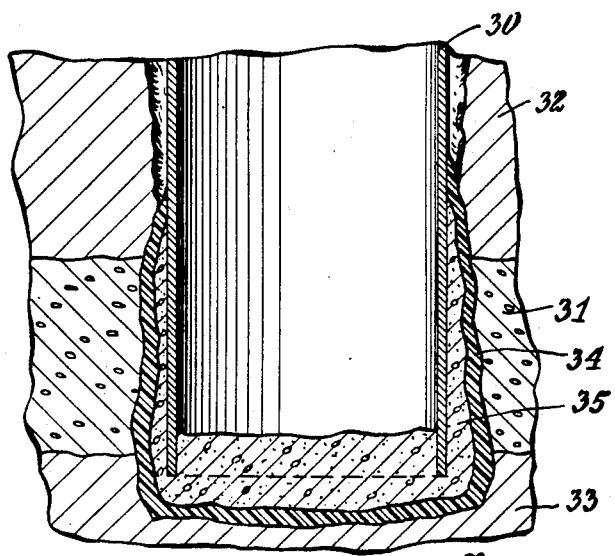
Fig. 3 is a shortened vertical view in section showing a bore hole wall embodying the invention.

In the case shown in Fig. 3 there is a casing 30 in the bore hole with the lower end thereof through a pervious or water bearing stratum 31 between a pair of impervious strata 32 and 33. In order to seal off the stratum 31 like before, slurry SII is pumped through the casing 31 to a level above the lower extremity thereof and is under pressure of 10,000–15,000 pounds per square inch to drive the slurry upwardly in the space between the casing and the stratum 31 and the reaction product component is squeezed outwardly to provide an acetone-formaldehyde rich outer layer 34 and a Portland cement rich inner layer 35. The pressure is maintained for the desired period of time. After setting, like in Fig. 1, there will be a plug or seal of acetone-formaldehyde rich inner layer which is now solidified and an outer layer of set or hardened Portland cement rich outer layer 35 blocking off or sealing the stratum 31, and also plugging the end of the casing. If it is desired to extend the bore hole, all that need be done is to drill through the plug hardened at the end of the casing and the remainder of the hardened mass between the casing and the stratum 31 will remain to effectively plug or seal that stratum.

Figure 4:
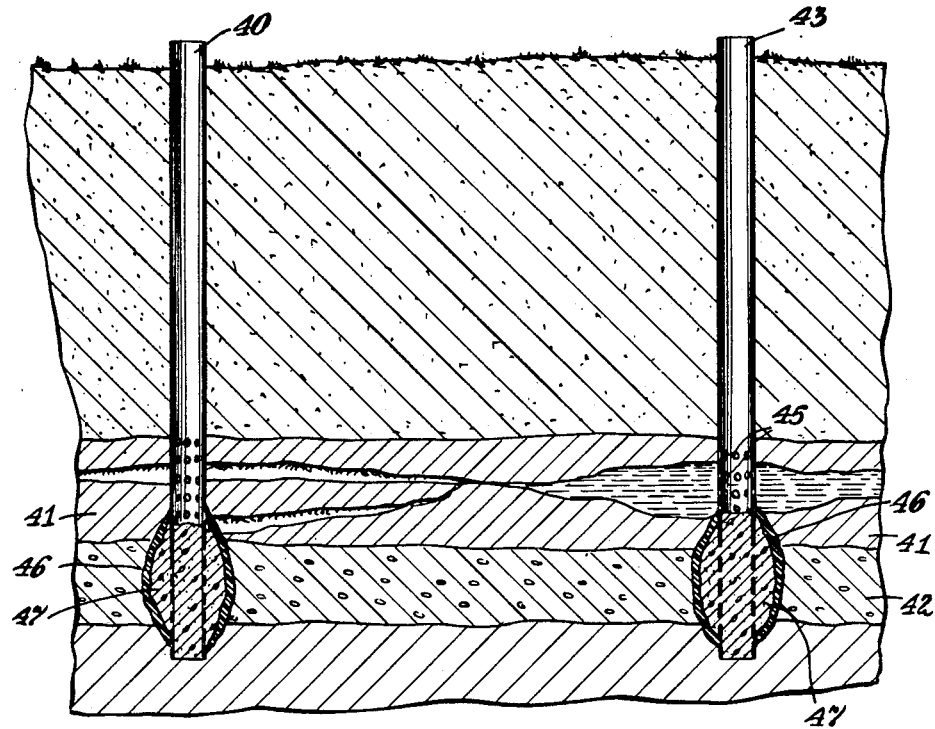
Fig. 4 is a shortened vertical view of bore hole wall embodying the invention.

In still another case in the oil field, there may be a dry well with a casing 40 as shown in Fig. 4. The lower end of the casing 40 extends through adjacent layers or strata 41 and 42, with the layer 41 being oil bearing while the stratum 42 is highly pervious and may or may not be loaded with water. Another bore hole may be drilled a considerable distance from casing 40 and there may be located therein a pipe or casing 43 the lower end of which has holes 45 therethrough as does the lower end of casing 40. Fluid, such as water, under pressure is forced into casing 43 with the purpose of forcing the oil out of stratum 41 into casing 40. Because the stratum 42 is pervious, the water under pressure follows the path of least resistance and therefore the fluid forced into casing 40 would be mostly water. Therefore it is necessary to remedy that condition. For this purpose, a slurry such as SII is pumped into the lower end of each of the casings 40 and 43 to fill the lower parts and to be forced through the casing openings into the stratum 42 and like before is maintained at pressure of about 10,000–15,000 pounds per square inch until set and hardened. And, like in Fig. 1, there is an outer layer 46 rich in acetone-formaldehyde which has been set and an inner Portland cement rich layer 47 which has been hardened or set. Now with fluid under pressure in casing 43, the fluid is blocked off from the now sealed pervious layer 42 and its pressure is exerted on the oil in the stratum 41 to force it into and up through casing 40.

Figure 5:
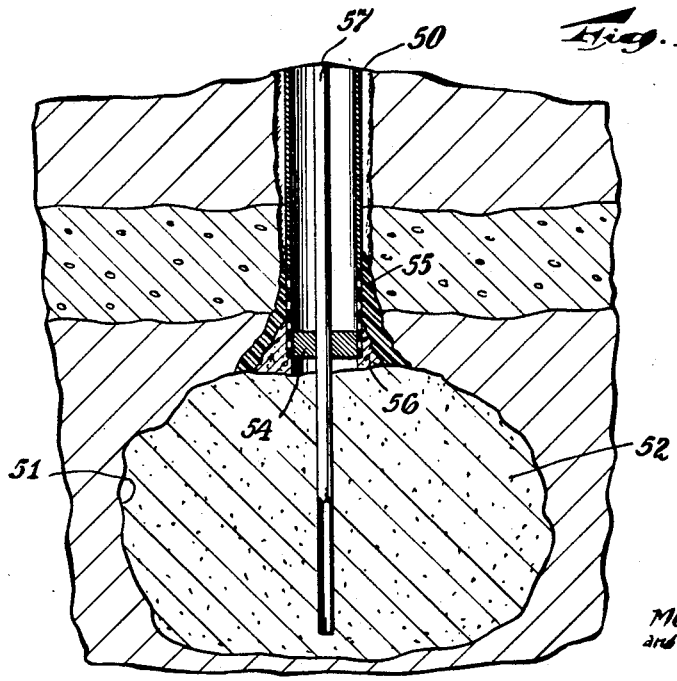
Fig. 5 is a shortened vertical view showing a bore hole wall, with the casing sealed to the bore hole wall and embodying the invention.

In still another case in the oil or gas field, there may be a dry well or a well of salt deposit with a casing 50 extending through the earth into well 51 filled with salt 52 as shown in Fig. 5. In this case the object might be to dissolve and flush out the salt so that the well could be employed as a natural storage tank for gases and the like. In order that the well may be employed for this purpose, it might be necessary to seal the lower end of the casing to the outlet mouth of the well to prevent the escape of gases, for example which may be forced into the well. This may be accomplished by plugging the lower end of the casing 50 with a plug 54 and the holes are shot through the lower end of the casing. A slurry such as SII is pumped down into the casing 50 and forced out through the shot holes therein into the space between the lower end of the casing and the mouth of the well. Ordinarily the salt level is close to the lower extremity of the casing. The slurry thus becomes applied to the earth bore structure and is maintained under pressure of 10,000–15,000 lbs. per square inch whereupon it is driven upwardly in the space between the casing 50 and the earth therearound at the lower part of the well and the reaction product component is squeezed outwardly to provide an acetone-formaldehyde rich outer layer 55 and a Portland cement rich inner layer 56. This pressure is maintained for the desired period of time and after setting, like in Fig. 1, there will be a plug or seal of acetone-formaldehyde rich outer layer which is now solidified and a set or hardened Portland cement rch inner layer. Then that portion of the slurry which has become hardened and is located in the bottom of the casing is drilled out as well as the plug so that there may now be extended through the length of the casing a pipe 57 through which water may be admitted to the salt to dissolve it and the salt solution is forced upwardly through the casing 50. In this illustrative example, it is apparent that there is provided a seal between the lower end of the casing and the mouth of the well and this seal prevents the escape of gas which is admitted into the storage chamber 51 after the salt has been removed therefrom in the manner heretofore set forth.

Of course, it is understood that various other slurries may be used instead of that known as SII; any of the other ketone-aldehyde reaction products, examples of which are Products B—JJ, may be substituted for Product A in SII; also the ratio of Portland cement to the ketone aldehyde reaction product may be varied over very wide limits as may be the quantity of water used; and also there may be substituted other inorganic alkaline material in place of the Portland cement. When no Portland cement is used the quantity of calcium hydroxide employed may be 2% or more by weight of the acetone-formaldehyde in solution or slurry or such chemical equivalent of the calcium hydroxide may be used.

Also one or more additives may be employed together with the straight alkaline solution or slurry of the ketone-aldehyde reaction products or with the hydraulic cement-water-ketone-aldehyde reaction products, examples of which are SI and SII, for various purposes, for example, to control the setting time of the mass, to control the nature or characteristics of the mass when set or for a variety of other reasons. Other materials usable with the acetone-formaldehyde organic reaction products and adapted to serve as catalysts or setting agents together with or in place of the alkaline clays (bentonite, etc.), plaster of Paris and Portland cement are water soluble amines (aniline), triethenolamine and similar amines, sodium, potassium and ammonium caseinates, animal glue, blood albumen, egg albumen, lime, soda ash, potash and other water soluble alkaline materials. Some other substances which may be employed as additives are formaldehyde reaction products of other ketones, such as methyl ethyl ketone, mesityl oxide, isopropyl methyl ketone, furfural-ketone reaction products, furfuryl alcohol, furfuryl alcohol-formaldehyde reaction products, partially hydrogenated furfural-ketone reaction products in which the degree of hydrogenation is 15–65% of the amount of hydrogen required to saturate all carbon to carbon double bonds, also acid polymers of said partially hydrogenated furfural-ketone reaction products, alkyd resins, polyester resins, epon resins and phenolic resins, such as the phenol-aldehyde resins, cashew liquid derivatives and urea resins.

It is also within the purview of this invention to substitute the acetone-formaldehyde resins herein entirely or in part for the resin component of other known compositions and especially those also containing an hydraulic cement and used to treat the bore hole wall structure for the purposes hereinbefore set forth.

Besides being useful to treat bore hole structures, said compositions of hydraulic cement, water and ketone-aldehyde are also useful for the production of ceramic pipes and conduits, roadways, sidewalks, tank linings and other protective surfaces.

Also in the treatment of an earth bore wall, it may not always be required to have the slurry, such as SII, under such pressure as to squeeze out the acetone-formaldehyde as shown in the drawings and as described herein. Those illustrations are set forth merely to show type of combination of hydraulic cement and ketone-aldehyde reaction product. In some cases the combination may be put in place and without any appreciable squeezing out of the reaction product is allowed to set to the substantially solid set state, with the hydraulic cement and ketone-aldehyde both solidified and set and being substantially uniformly distributed with respect to each other.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

This application is a continuation-in-part of our copending application 350,982 filed April 24, 1953, now abandoned, which in turn is a continuation of 122,852 filed October 21, 1949 and now abandoned, which in turn was a continuation-in-part of 99,114 filed June 14, 1949 and issued as U. S. Patent 2,683,133 on July 6, 1954, and also of our copending applications 492,052 filed March 3, 1955 and 612,932 filed October 1, 1956.

We claim:

1. An earth bore wall structure, a portion thereof comprising a combination of hydraulic cement and acetone-formaldehyde organic reaction product in the substantially solid state.

2. An earth bore wall structure, a portion thereof comprising a combination of Portland cement and acetone-formaldehyde organic reaction product in the substantially solid state.

3. A novel composition of matter comprising hydraulic cement, water and acetone-formaldehyde organic reaction product, said organic reaction product characterized as normally being in the liquid state and capable of being converted to the solid state.

4. A novel composition of matter comprising Portland cement, water and acetone-formaldehyde organic reaction product, said organic reaction product normally being liquid and capable of being converted to the substantially solid state.

5. The method comprising applying to an earth bore wall structure a slurry containing Portland cement and acetone-formaldehyde organic reaction product.

6. The method comprising applying to an earth bore wall structure a slurry containing hydraulic cement and acetone-formaldehyde organic reaction product.

7. The method of sealing earth formation which comprises forcing thereagainst a slurry comprising water, hydraulic cement and acetone-formaldehyde organic reaction product, said organic reaction product normally being in the liquid state and capable of being converted to the solid state, whereby some of the latter is forced out of mixture with said hydraulic cement and into said formation and cured in said formation thereby forming a sheath adjacent said hydraulic cement.

8. The method of sealing earth formation which comprises forcing thereagainst a slurry comprising water, Portland cement and acetone-formaldehyde organic reaction product, said organic reaction product normally being in the liquid state and capable of being converted to the solid state, whereby some of the latter is forced out of mixture with said Portland cement and into said formation and cured in said formation thereby forming a sheath adjacent said Portland cement.

9. An earth bore wall structure in a permeable formation, having an inner portion comprising a set hydraulic cement containing a cured acetone-formaldehyde organic reaction product and an outer layer of said cured acetone-formaldehyde organic reaction product adjacent said inner portion.

10. An earth bore wall structure in a permeable formation, having an inner portion comprising a set Portland cement containing a cured acetone-formaldehyde organic reaction product and an outer layer of said cured acetone-formaldehyde organic reaction product adjacent said inner portion.

11. An earth bore wall structure, a portion thereof comprising a combination of hydraulic cement, acetone-formaldehyde organic reaction product and another ketone-aldehyde organic reaction product in the substantially solid state.

12. The method comprising applying to an earth bore wall structure a slurry containing hydraulic cement, acetone-formaldehyde organic reaction product and another ketone-aldehyde organic reaction product.

13. A novel composition of matter comprising hydraulic cement, water and acetone-formaldehyde organic reaction product, said reaction product normally being water-soluble and capable of being converted to the substantially water-insoluble state.

14. An earth bore wall structure, a portion thereof comprising a combination of hydraulic cement and mixed ketones-formaldehyde organic reaction product in the substantially solid state, one of said ketones being acetone.

15. A novel composition of matter comprising hydraulic cement, water and mixed ketones-formaldehyde organic reaction product, one of said ketones being acetone.

References Cited in the file of this patent

UNITED STATES PATENTS

| 2,462,031 | Wittcoff | Feb. 15, 1949 |
| 2,492,212 | Dailey | Dec. 27, 1949 |
| 2,504,835 | Hewett et al. | Apr. 18, 1950 |
| 2,512,716 | Courtney | June 27, 1950 |
| 2,626,934 | Kesler | Jan. 27, 1953 |